(12) United States Patent
Overholt

(10) Patent No.: US 12,471,565 B1
(45) Date of Patent: Nov. 18, 2025

(54) ANIMAL FEEDING SYSTEM HAVING A MOUNTABLE FEEDING BUCKET

(71) Applicant: Constance Jean Overholt, Cleveland, TN (US)

(72) Inventor: Constance Jean Overholt, Cleveland, TN (US)

( * ) Notice: Subject to any disclaimer, the term of this patent is extended or adjusted under 35 U.S.C. 154(b) by 0 days.

(21) Appl. No.: 18/481,680

(22) Filed: Oct. 5, 2023

Related U.S. Application Data

(60) Provisional application No. 63/422,316, filed on Nov. 3, 2022.

(51) Int. Cl.
*A01K 5/01* (2006.01)

(52) U.S. Cl.
CPC .................. *A01K 5/0107* (2013.01)

(58) Field of Classification Search
CPC .................................... A01K 5/0107
USPC ........................................ 248/692
See application file for complete search history.

(56) References Cited

U.S. PATENT DOCUMENTS

| | | | | |
|---|---|---|---|---|
| 409,152 A * | 8/1889 | Kinney | .................. | B44D 3/123 |
| | | | | 248/692 |
| 1,064,745 A | 6/1913 | Klenert | | |
| 3,419,196 A | 12/1968 | Moore | | |
| 4,976,222 A | 12/1990 | Cooke | | |
| 5,105,769 A * | 4/1992 | Smith | .................. | A01K 5/0135 |
| | | | | 119/61.5 |
| 5,394,832 A | 3/1995 | Briley | | |
| 5,870,969 A * | 2/1999 | Boyce | ....................... | A01K 5/01 |
| | | | | 119/51.5 |
| 6,363,885 B1 * | 4/2002 | Akins | .................. | A01K 5/0135 |
| | | | | 119/51.01 |
| 7,681,525 B1 | 3/2010 | Trulove | | |
| 10,117,415 B2 | 11/2018 | Crews | | |
| 10,149,455 B2 | 12/2018 | Tharp | | |
| 2003/0102418 A1 | 6/2003 | Hansen | | |
| 2003/0146220 A1 * | 8/2003 | Kaura | .................. | B65D 43/022 |
| | | | | 220/751 |
| 2007/0045492 A1 * | 3/2007 | Moran | .................. | F41C 33/006 |
| | | | | 248/222.11 |
| 2019/0274280 A1 | 9/2019 | Virus | | |
| 2022/0248635 A1 * | 8/2022 | Ferris | ....................... | A01K 5/01 |

(Continued)

FOREIGN PATENT DOCUMENTS

CN     105123547 A  *  12/2015

*Primary Examiner* — Christopher D Hutchens
(74) *Attorney, Agent, or Firm* — John Rizvi; John Rizvi, P.A.—The Patent Professor ®

(57) ABSTRACT

An animal feeding system that includes a feed bucket having a receptacle with a base, sidewalls, and a rim that defines an opening opposite the base. The base and the sidewalls define a space configured to receive and store feed. A mounting portion of the feed bucket has an upper wall extending from the sidewalls and an outer wall extending from the upper wall and spaced apart from the sidewalls to define a recess therebetween. The mounting portion has a slot adjacent a lower end of the receptacle that provides access to the recess. The animal feeding system further includes a mounting bracket configured to be secured to a structure. The mounting bracket has a securing member configured to be received through the slot and into the recess of the mounting portion to releasably secure the feed bucket to the structure.

14 Claims, 10 Drawing Sheets

(56) References Cited

U.S. PATENT DOCUMENTS

2022/0322635 A1* 10/2022 McCormick ......... A01K 5/0114
2024/0373817 A1* 11/2024 Martinez .................. A01K 7/00

* cited by examiner

ANIMAL FEEDING SYSTEM HAVING A MOUNTABLE FEEDING BUCKET

CROSS-REFERENCE TO RELATED APPLICATIONS

This application claims the benefit of U.S. Provisional Patent Application Ser. No. 63/422,316, filed on Nov. 3, 2022, which is incorporated by reference herein in its entirety.

FIELD OF THE INVENTION

The present invention relates generally to animal feeding systems, and more particularly, to an animal feeding system that includes a mountable feed bucket that promotes ease of positioning in a secure location for feeding an animal, such as a horse.

BACKGROUND OF THE INVENTION

Feeds for horses generally include forages (e.g., hay, grass, etc.), concentrates (e.g., grain, prepared pellets, etc.), and supplements (e.g., prepared vitamin or mineral pellets). Forages are often a primary source of nutrients; however, horse diets are commonly supplemented with concentrates and supplements. Concentrates and supplements may be feed to horses by various means such as feed bags, feed buckets, feed tubs, or even by hand.

Feed buckets are particularly convenient and are often mounted to fence rails, stall walls, or the like to provide a comfortable way to feed horses. However, common feed buckets and methods of mounting such feed buckets to structures often have various shortcomings. For example, feed buckets may be loosely secured to the structure in a manner that allows the horse to knock the feed bucket onto the ground. This can waste feed, increase a difficulty of feeding for the horse, and/or require an individual to retrieve the feed bucket which can be hazardous. This issue may be solved by permanently securing the feed bucket to the structure. However, this can cause other issues such as an increased difficulty in cleaning and filling the feed bucket.

In addition to the above, certain feed buckets may be uncomfortable for the horse during feeding. For example, feed buckets usually include a handle that may interfere with the horse's ability to access the opening of the feed bucket. This can require the horse to squeeze their heads between the handle and a rim of the feed bucket.

Accordingly, there is an established need for a mountable animal feed bucket that can be easily and releasably secured to a structure.

SUMMARY OF THE INVENTION

The present invention is directed to a convenient and ergonomic animal feeding system that includes a feed bucket that includes a receptacle portion having a base at a lower end thereof, sidewalls coupled to the base, and a rim of the sidewalls defining an opening at an upper end thereof opposite the base, wherein the base and the sidewalls in combination define a space configured to receive and store feed, and a mounting portion having an upper wall fixed to and extending from the sidewalls of the receptacle portion and an outer wall extending from the upper wall along and spaced apart from the sidewalls of the receptacle to define a recess between the upper wall and the outer wall of the mounting portion and the sidewalls of the receptacle portion, the mounting portion having a slot adjacent a lower end of the receptacle portion that provides access to the recess. The animal feeding system further includes a mounting bracket configured to be secured to a structure, the mounting bracket having a securing member configured to be received through the slot and into the recess of the mounting portion to releasably secure the feed bucket to the structure.

In a first implementation of the invention, an animal feeding system comprises a feed bucket that includes a receptacle portion having a base at a lower end thereof, sidewalls coupled to the base, and a rim of the sidewalls defining an opening at an upper end thereof opposite the base, wherein the base and the sidewalls in combination define a space configured to receive and store feed, and a mounting portion having an upper wall fixed to and extending from the sidewalls of the receptacle portion and an outer wall extending from the upper wall along and spaced apart from the sidewalls of the receptacle portion to define a recess between the upper wall and the outer wall of the mounting portion and the sidewalls of the receptacle portion, the mounting portion having a slot adjacent a lower end of the receptacle portion that provides access to the recess. The animal feeding system further includes a mounting bracket configured to be secured to a structure, the mounting bracket having a securing member configured to be received through the slot and into the recess of the mounting portion to releasably secure the feed bucket to the structure.

In a second aspect, the sidewalls of the receptacle portion may have contoured cross-sectional shapes that extend from the base of the receptacle portion, protrude inward, and then flare outward at the rim.

In another aspect, the base of the receptacle portion may include a centrally located raised portion protruding inward that defines a ring-shaped recess between sides of the raised portion and the sidewalls of the receptacle portion adjacent the base.

In another aspect, the mounting bracket may include a recess configured to receive and releasably retain the outer wall of the mounting portion therein.

In another aspect, the receptacle portion may include a handle having ends thereof pivotally coupled to oppositely disposed sides of the rim of the receptacle. In another aspect, the ends of the handle may be configured to pivot relative to the rim such that the handle may contact and rest against a portion of the rim, wherein the portion of the rim includes a recess configured to promote gripping of the handle when resting on the rim.

In another aspect, the mounting bracket may include a body having a serpentine cross-sectional shape defined by substantially parallel spaced apart plates, a first of the plates defining the securing member, a second of the plates defining an intermediate member coupled to the securing member at lower ends of the securing member and the intermediate member, and a third of the plates defining a rear member secured to the intermediate member at upper ends of the intermediate member and the rear member, wherein a space between the securing member and the intermediate member is configured to receive the rear wall of the mounting portion of the feed bucket and a space between the intermediate member and the rear member is configured to receive a portion of the wall of the structure or a body fixed thereto.

In another aspect, the mounting portion may include sidewalls extending from the sidewalls of the receptacle portion and are connected to the outer wall of the mounting portion such that the slot is the sole access to the recess.

In another aspect, the mounting bracket may be a channel plate bracket that includes a first plate configured to be secured to the wall of the structure, oppositely disposed end walls extending from the first plate, and a pair of oppositely disposed flanges connected to and extending from the end walls, wherein the flanges extend toward each other.

In another aspect, the mounting bracket may be configured to be secured to the structure with fasteners.

In a second implementation of the invention, a method comprises providing a feed bucket that includes a receptacle portion having a base at a lower end thereof, sidewalls coupled to the base, and a rim of the sidewalls defining an opening at an upper end thereof opposite the base, and a mounting portion having an upper wall fixed to and extending from the sidewalls of the receptacle portion and an outer wall extending from the upper wall along and spaced apart from the sidewalls of the receptacle portion to define a recess between the upper wall and the outer wall of the mounting portion and the sidewalls of the receptacle portion, the mounting portion having a slot adjacent a lower end of the receptacle portion that provides access to the recess. The method further includes securing a mounting bracket to a structure, coupling the feed bucket to the mounting bracket by inserting a securing member of the mounting bracket through the slot and into the recess of the mounting portion of the receptacle portion to releasably secure the feed bucket to the structure, and storing an animal feed in a space of the receptacle portion defined by, in combination, the base and the sidewalls thereof.

In another aspect, the sidewalls of the receptacle portion may have contoured cross-sectional shapes that extend from the base of the receptacle portion, protrude inward, and then flare outward at the rim.

In another aspect, the base of the receptacle portion may include a centrally located raised portion protruding inward that defines a ring-shaped recess between sides of the raised portion and the sidewalls of the receptacle portion adjacent the base.

In another aspect, coupling the feed bucket to the mounting bracket may include receiving and releasably retaining the outer wall of the mounting portion of the receptacle portion in a recess of the mounting bracket.

In another aspect, the receptacle portion may include a handle having ends thereof pivotally coupled to oppositely disposed sides of the rim of the receptacle portion.

In another aspect, the method may include pivoting the ends of the handle relative to the rim such that the handle contacts and rests against a portion of the rim, and then gripping the handle adjacent a recess in the portion of the rim while the handle is resting on the rim.

In another aspect, the mounting bracket may include a body having a serpentine cross-sectional shape defined by substantially parallel spaced apart plates, a first of the plates defining the securing member, a second of the plates defining an intermediate member coupled to the securing member at lower ends of the securing member and the intermediate member, and a third of the plates defining a rear member secured to the intermediate member at upper ends of the intermediate member and the rear member, wherein a space between the securing member and the intermediate member is configured to receive the rear wall of the mounting portion of the feed bucket and a space between the intermediate member and the rear member is configured to receive a portion of the structure or a body fixed thereto.

In another aspect, the mounting portion may include sidewalls extending from the sidewalls of the receptacle portion and are connected to the outer wall of the mounting portion such that the slot is the sole access to the recess.

In another aspect, the mounting bracket may be a channel plate bracket that includes a first plate configured to be secured to the structure, oppositely disposed end walls extending from the first plate, and a pair of oppositely disposed flanges connected to and extending from the end walls, wherein the flanges extend toward each other.

In another aspect, the method may include securing the mounting bracket to the wall of the structure with fasteners.

These and other objects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, where like designations denote like elements, and in which.

Like reference numerals refer to like parts throughout the several views of the drawings.

DETAILED DESCRIPTION

Figure 1:
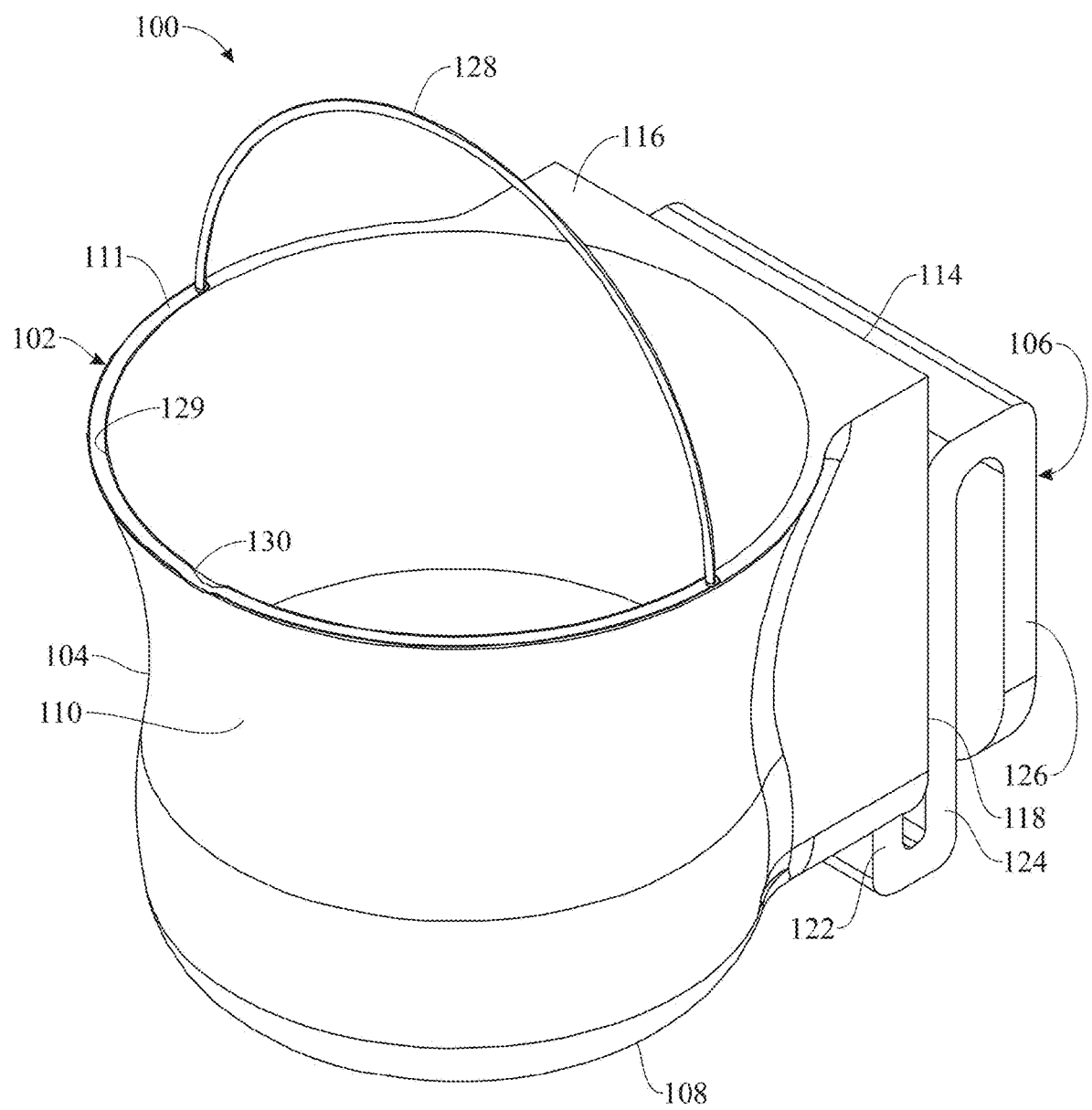
FIG. 1 presents a perspective view of an animal feeding system in accordance with a first embodiment of the present invention.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Shown throughout the figures, the present invention is directed toward a convenient and ergonomic animal feeding system that is convenient to secure, for example, to a wall, a gate, a fence, a barrier, or another fixed or securable structure (collectively referred to herein as a structure or structures). In various embodiments, the animal feeding system may provide one or more of several benefits including, but not limited to, promoting a secure position during animal feeding, promoting ease of securement to various structures, promoting comfort for an animal during feeding thereof, and promoting a reduced rate of feeding.

Referring initially to FIGS. 1-6, a first embodiment of the animal feeding system, referred to herein as the animal feeding system 100, includes a feed bucket 102 and a mounting bracket 106 configured to secure the feed bucket 102 to a structure.

The feed bucket 102 includes a receptacle portion 104 having a base 108 at a lower end thereof, sidewalls 110 coupled to the base 108, and a rim 111 of the sidewalls 110 defining an opening at an upper end thereof opposite the base 108. The base 108 and the sidewalls 110, in combination, define a space configured to receive and store animal feed or the like. The feed bucket 102 can have any suitable dimensions, but in one embodiment can be from about 12 inches in diameter up to about 24 inches in diameter, preferably from about 14 inches in diameter to about 18 inches in diameter and most preferably about 16 inches in diameter. The feed bucket 102 can have a depth of from about 16 inches deep up to about 24 inches deep, more preferably from about 18 inches deep to about 20 inches deep and most preferably about 19 inches deep. The sidewalls 110 of the receptacle portion 104 have contoured cross-sectional shapes that extend from the base 108 of the receptacle portion 104, protrude inward, and then flare outward away at the rim 111. The base 108 of the receptacle portion 104 can include a centrally located raised portion 112 protruding inward that defines a ring-shaped recess between sides of the raised portion 112 and the sidewalls 110 of the receptacle portion 104 adjacent the base 108. This arrangement may promote the feed to slide toward or remain primarily in the ring-shaped recess about the perimeter of the base 108. Alternatively, the base 108 of the receptacle portion 104 can include 2, 3, 4, 5, 6 or more raised portions 112 (not shown) randomly or evenly distributed across the base. As such, the single or multiple raised portion(s) 112 of the base 108 may promote animal feeding at a reduced rate, that is, the raised portion(s) 112 may reduce a likelihood that an animal will eat too quickly. For example, if an animal eats too quickly without adequate chewing, certain issues may arise such as choking, colic, or other digestive system problems. Therefore, the feed bucket 102 may promote safe and healthy feeding habits as the location of the feed about the perimeter of the base 108 promotes smaller bites relative to a feed bucket 102 with a planar base 108.

The feed bucket 102 includes a mounting portion 114 having an upper wall 116 fixed to and extending from the sidewalls 110 of the receptacle portion 104. An outer wall 118 extends from the upper wall 116 along and spaced apart from the sidewalls 110 of the receptacle portion 104 to define a recess between the upper wall 116 and the outer wall 118 of the mounting portion 114 and the sidewalls 110 of the receptacle portion 104. The mounting portion 114 has a slot 120 adjacent a lower end of the receptacle portion 104 that provides access to the recess. The mounting portion 114 includes sidewalls 110 extending from the sidewalls 110 of the receptacle portion 104 and are connected to the outer wall 118 of the mounting portion 114 such that the slot 120 is the sole access to the recess. In this manner, the feed bucket 102 may be secured to the mounting bracket 106 without exposing the animal to any openings, protuberances, or the like that may cause harm to the animal. For example, existing feed buckets may have exposed gaps, openings, protuberances, and the like (e.g., connection points of handle) that an animal may snag their eyes, tails, fur, and the like on causing pain and/or harm.

The mounting bracket 106 includes a body having a serpentine cross-sectional shape defined by substantially parallel spaced apart plates. A first of the plates defines a securing member 122, a second of the plates defines an intermediate member 124 coupled to the securing member 122 at lower ends of the securing member 122 and the intermediate member 124, and a third of the plates defining a rear member 126 secured to the intermediate member 124 at upper ends of the intermediate member 124 and the rear member 126. The securing member 122 is configured to be received through the slot 120 and into the recess of the mounting portion 114 of the receptacle portion 104 to releasably secure the feed bucket 102 to the mounting bracket 106. A recess or space between the securing member 122 and the intermediate member 124 is configured to receive the outer wall 118 of the mounting portion 114 of the feed bucket 102 and a recess or space between the intermediate member 124 and the rear member 126 is configured to receive a portion of a structure for mounting thereto.

The receptacle portion 104 includes a handle 128 having ends thereof pivotally coupled to oppositely disposed sides of the rim 111 of the receptacle portion 104. The ends of the handle 128 are configured to pivot relative to the rim 111 such that the handle 128 may contact and rest against a portion of the rim 111. The portion of the rim 111 includes a recess 130 configured to promote gripping of the handle 128 when resting on the rim 111. In this example, the rim 111 defines a circular opening and therefore, the handle 128 includes a semi-circular shape configured to be aligned along the rim 111 while resting thereon. Pivoting the handle 128 towards the rim 111 allows an animal to eat from the feed bucket 102 without the handle 128 impeding the animal's access to the feed within the receptacle portion 104. In some embodiments, the rim 111 may include a channel 129 (see FIGS. 1 and 5) there along for receiving the handle 128 such that, while resting on the rim 111, the handle 128 is flush with the remainder of the rim 111, located below the remainder of the rim 111, or at least partially recessed into the channel 129, relative to the remainder of the rim 111.

Figure 2:
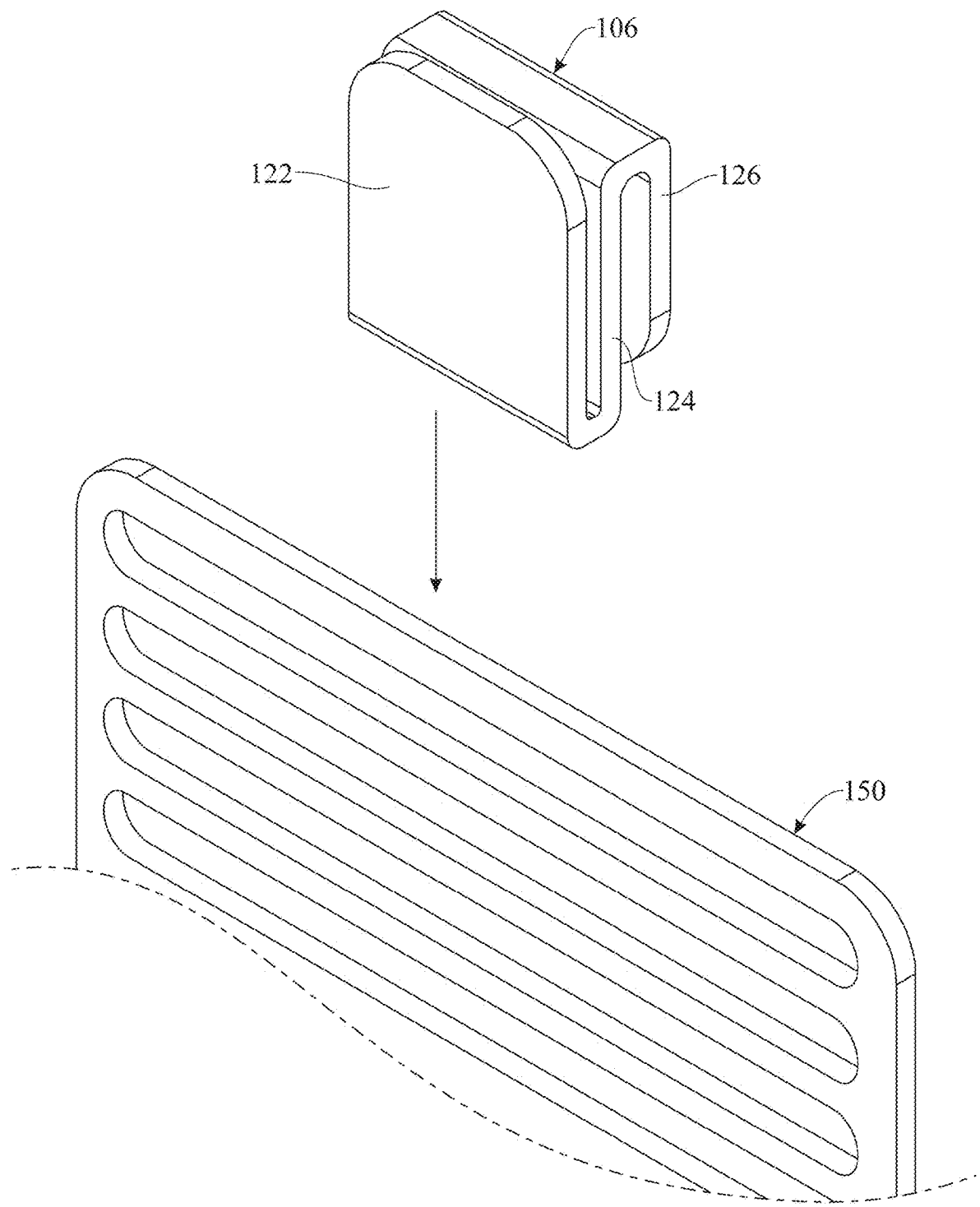
FIG. 2 presents a perspective view of a mounting bracket of the animal feeding system of FIG. 1 and illustrates a method of securing the mounting bracket to a structure.
Figure 3:
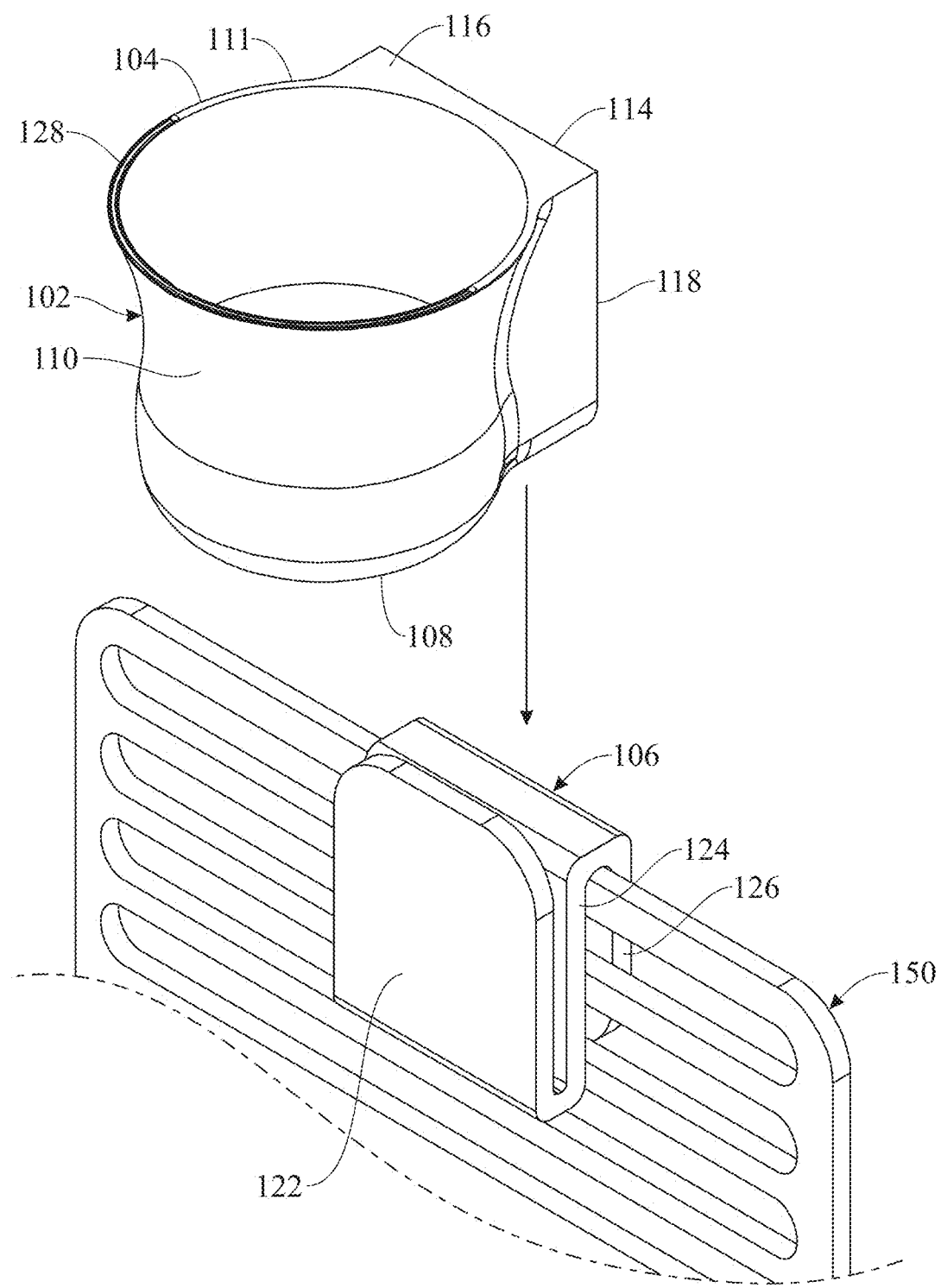
FIG. 3 presents a perspective view of the animal feeding system of FIG. 1 and illustrates a method of securing a receptacle portion thereof to the mounting bracket.
Figure 4:
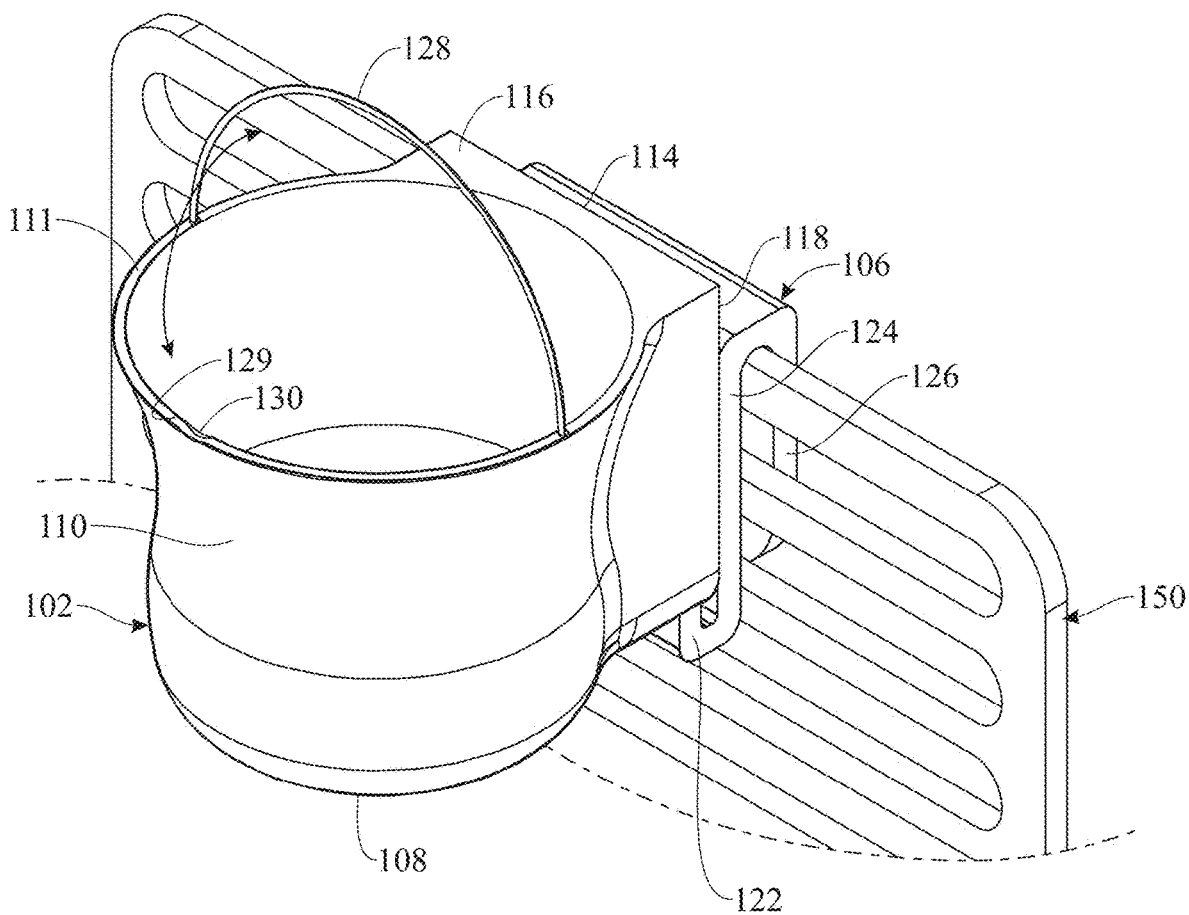
FIG. 4 presents a perspective view of the animal feeding system of FIG. 1 secure to the structure and illustrates a method of pivoting a handle of the receptacle.
Figure 5:
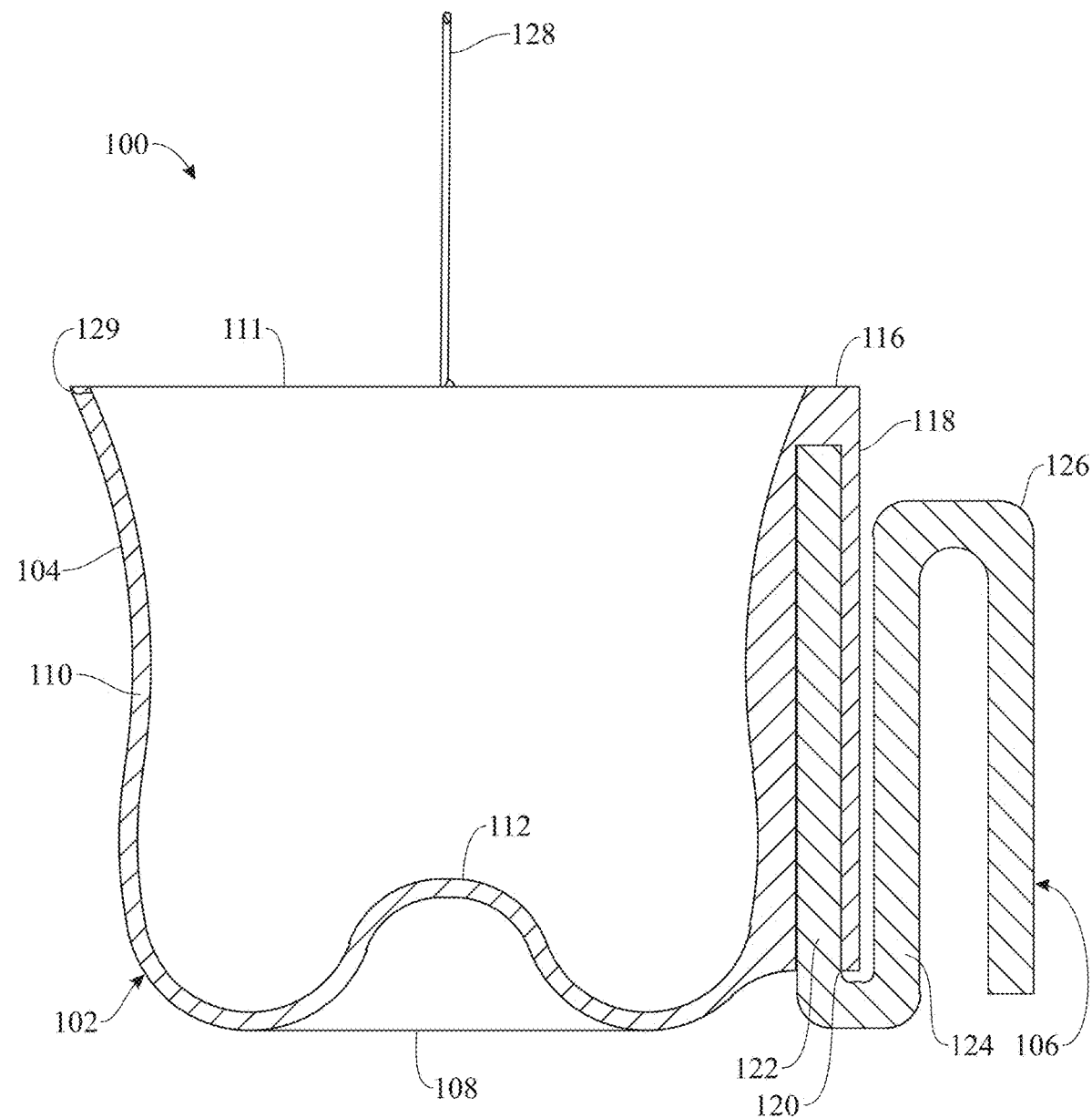
FIG. 5 presents a cross-sectional side view of the animal feeding system of FIG. 1.
Figure 6:
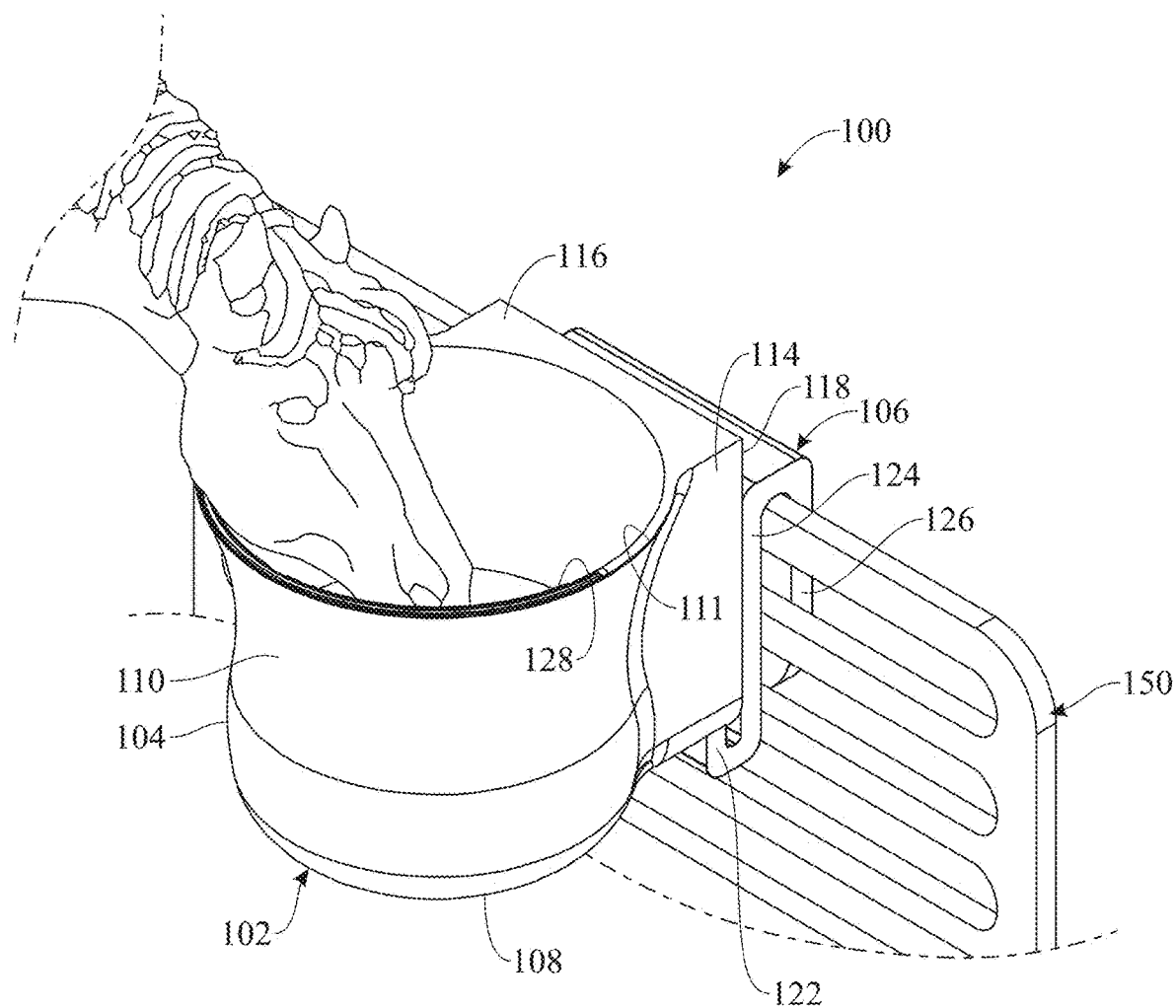
FIG. 6 presents a perspective view of the animal feeding system of FIG. 1 and illustrates a method of feeding a horse therewith.

FIGS. 2-4 illustrate a method of securing the mounting bracket 106 to a structure (i.e., a gate 150), securing the feed bucket 102 to the mounting bracket 106, and operating the handle 128, respectively. FIG. 6 illustrates a method of feeding a horse with the animal feeding system 100 while secured to the structure.

Referring now to FIGS. 7-11, a second embodiment of the animal feeding system, referred to herein as the animal feeding system 200, includes a feed bucket 202 and a mounting bracket 206 configured to secure the feed bucket 202 to a structure. Due to the similarities between the first embodiment and the second embodiment, the following discussion will focus primarily on the differences between the first embodiment and the second embodiment. Other aspects of the second embodiment that are not described herein may be substantially the same as described previously in relation to the first embodiment.

Figure 7:
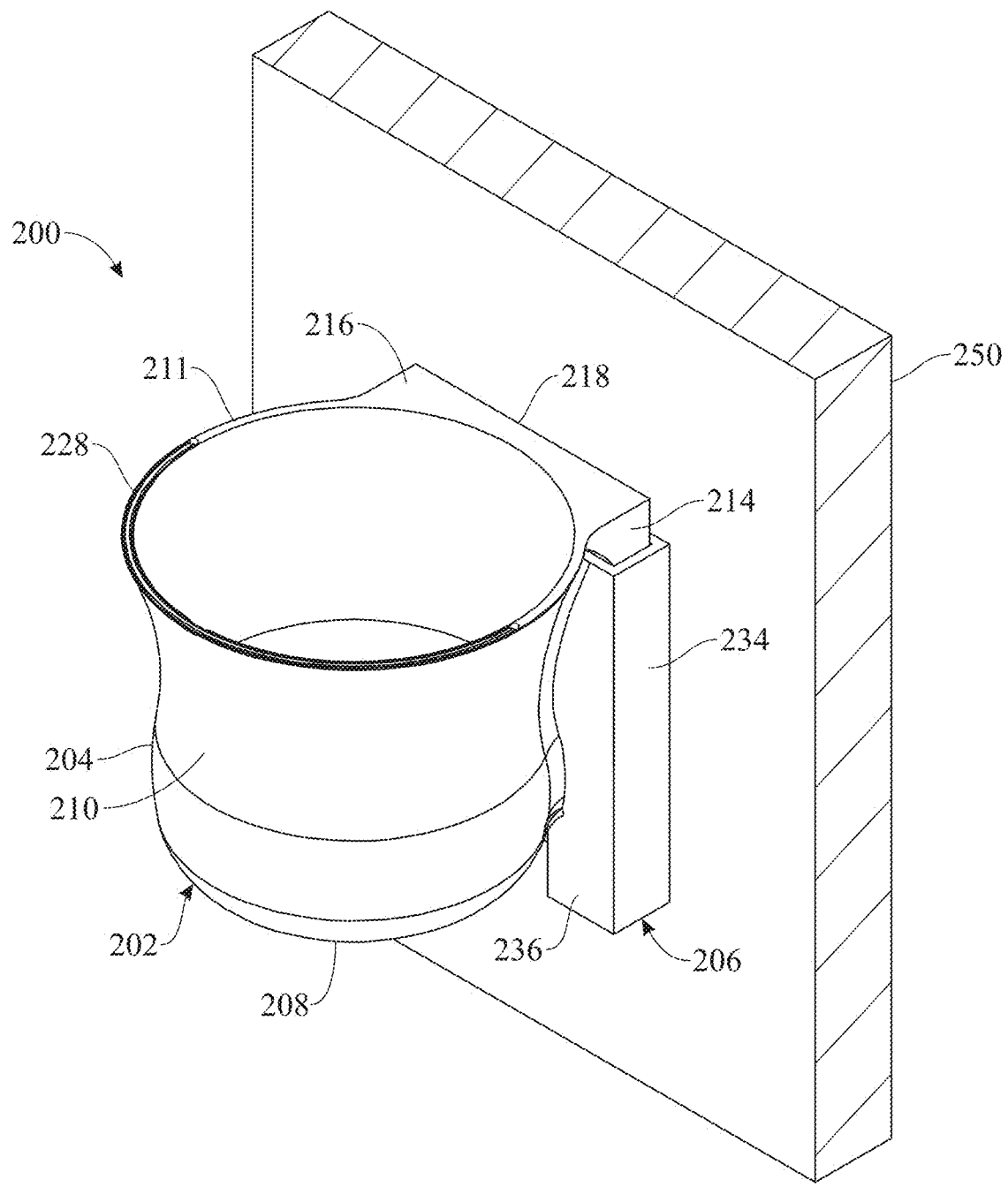
FIG. 7 presents a perspective view of an animal feeding system in accordance with a second embodiment of the present invention.
Figure 8:
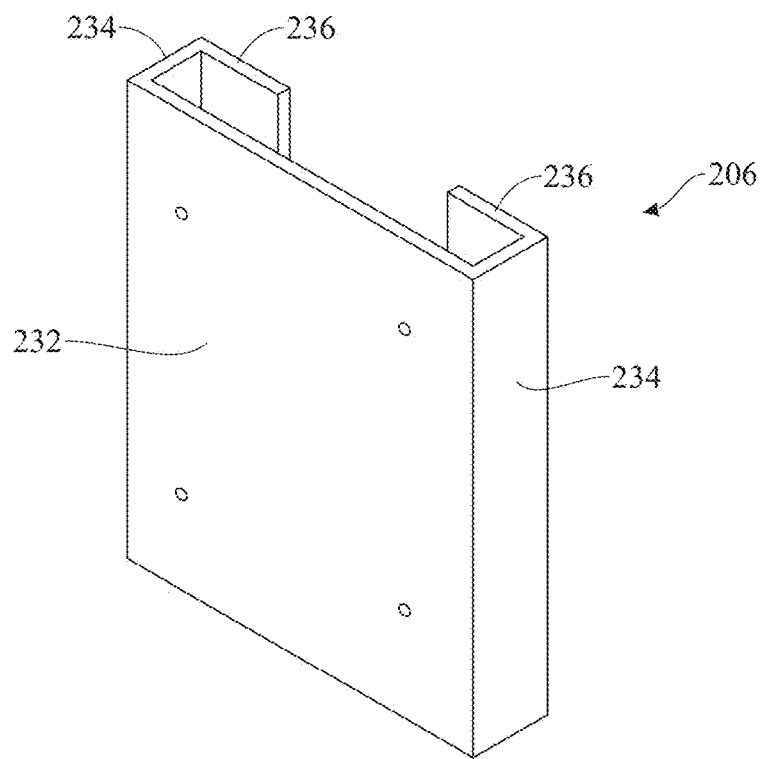
FIG. 8 presents a rear perspective view of a mounting bracket of the animal feeding system of FIG. 7.
Figure 9:
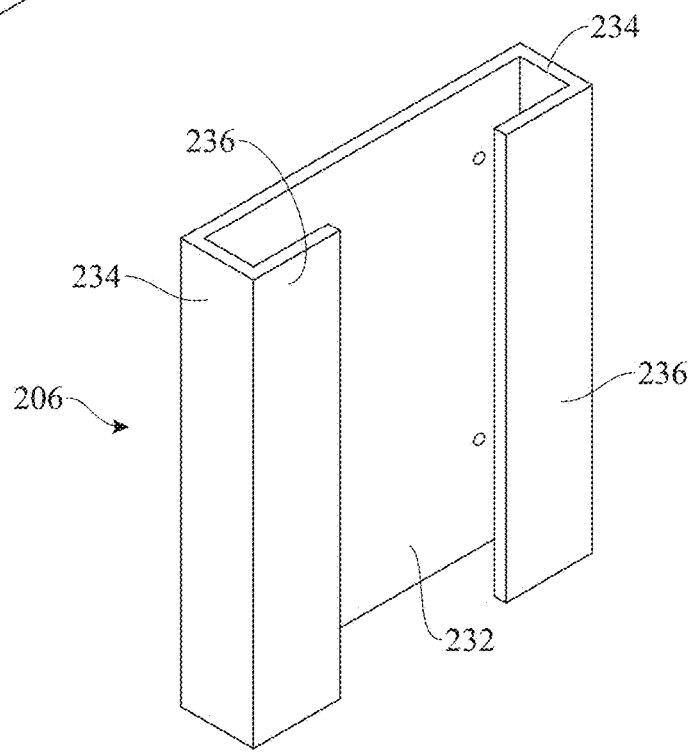
FIG. 9 presents a front perspective view of a mounting bracket of the animal feeding system of FIG. 7.

FIG. 7 presents the animal feeding system 200 with a receptacle portion 204 thereof secured to a structure (i.e., a wall 250) with a mounting bracket 206. The mounting bracket 206 is presented in detail in FIGS. 8 and 9. The mounting bracket 206 is a channel plate bracket that includes a first plate 232 configured to be secured to the wall of the structure, oppositely disposed end walls 234 extending from the first plate 232, and a pair of oppositely disposed flanges 236 connected to and extending from the end walls 234. As presented, the flanges 236 extend toward each other. The mounting bracket 206 is configured to be secured to the structure with fasteners 238. As such, the first plate 232 includes holes for receiving various types of fasteners such as screws or nails.

Figure 10:
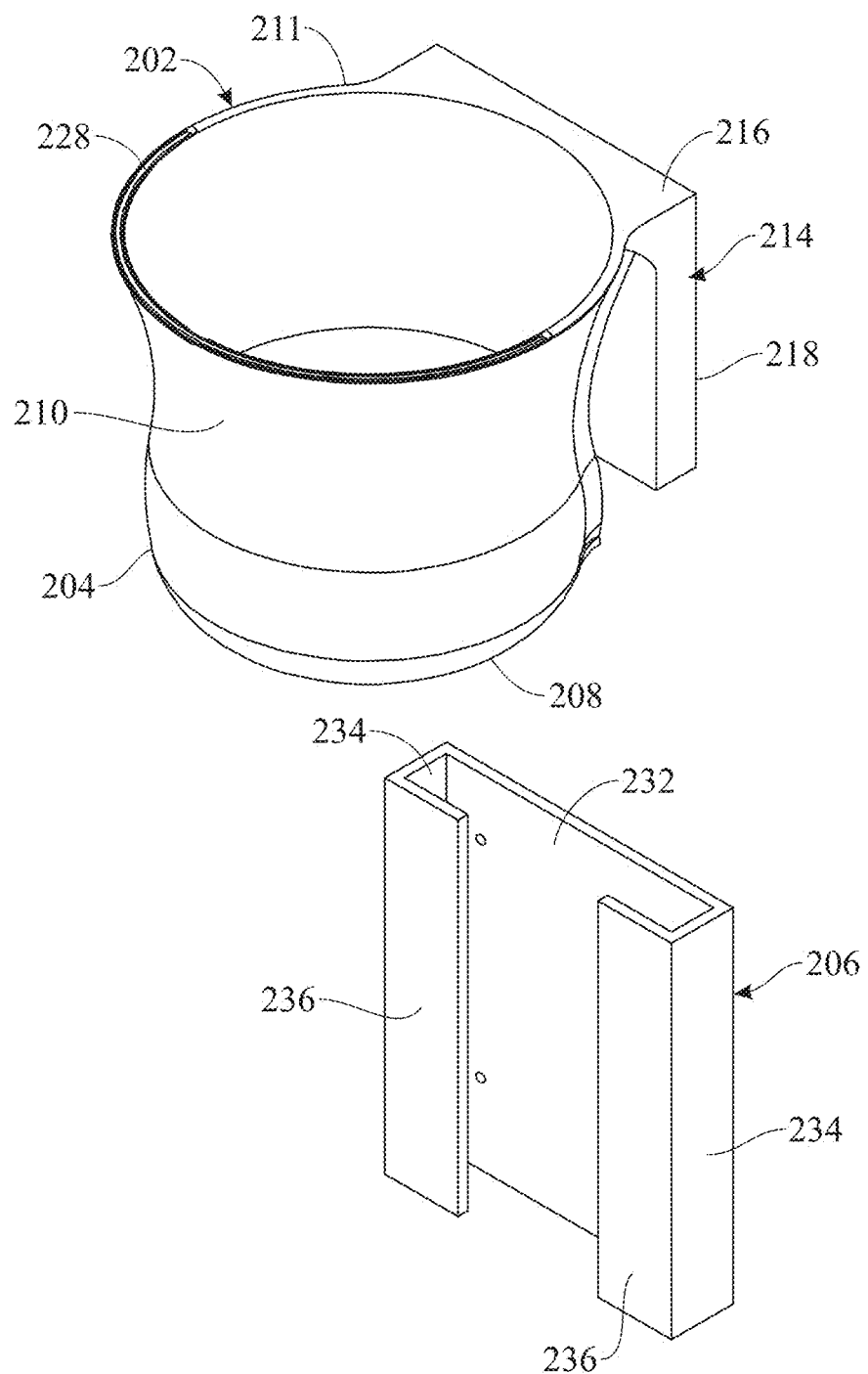
FIG. 10 presents a perspective, expanded view of the animal feeding system of FIG. 7; and, FIG. 11 presents a cross-sectional side view of the animal feeding system of FIG. 1 and illustrates a method of securing the animal feeding system to a structure.
Figure 11:
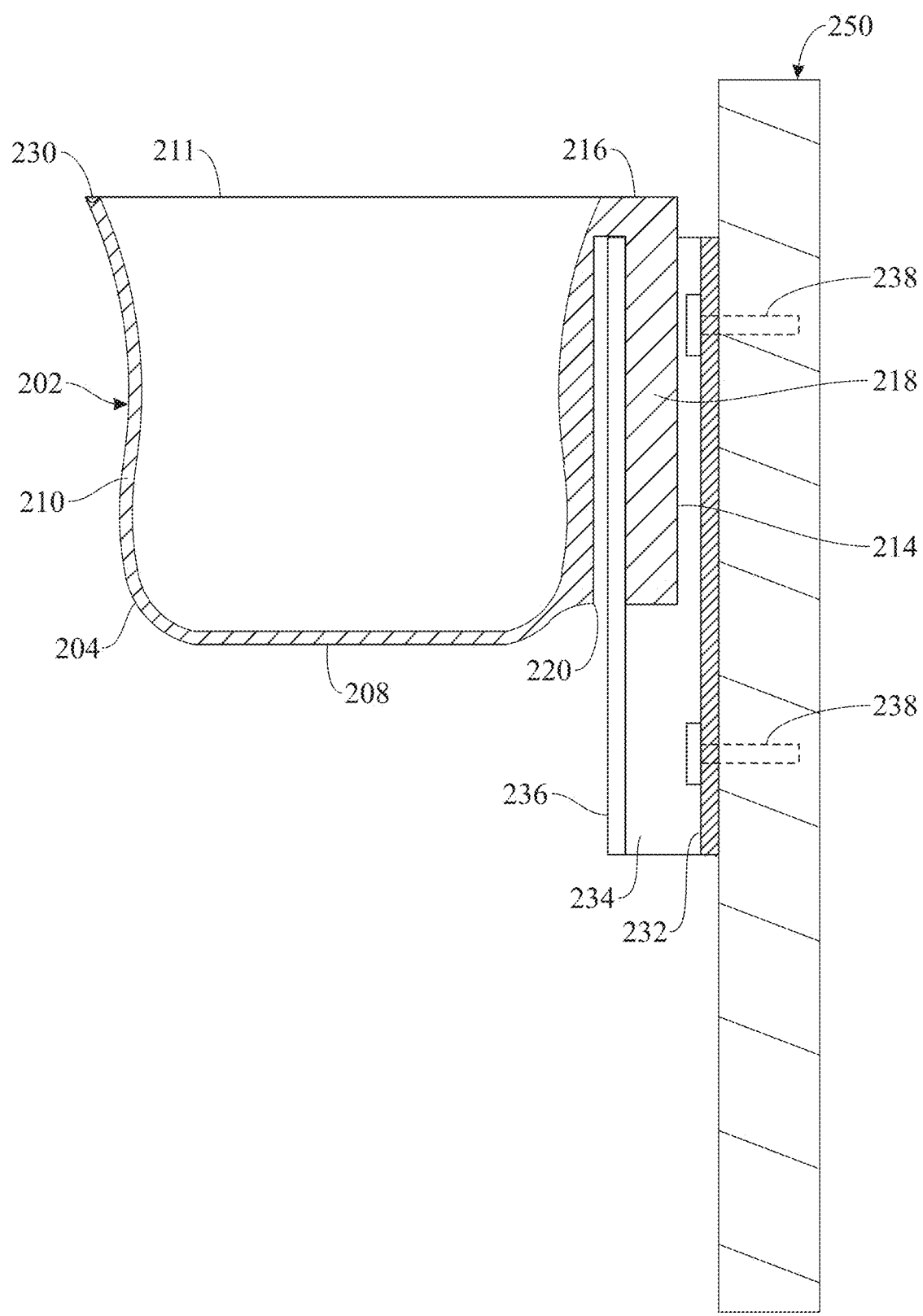

FIG. 10 presents a method of coupling the receptacle portion 204 to the mounting bracket 206. Specifically, an outer wall 218 of a mounting portion 214 of the receptacle portion 204 may be slidably inserted into a recess or space defined between the first plate 232, the end walls 234, and the flanges 236 of the mounting bracket 206. With the arrangement, the flanges 236 function as barriers against the outer wall 218 thereby securing and supporting the receptacle portion 204 with the mounting bracket 206. FIG. 11 presents a cross-sectional view of the animal feeding system 200. As presented, the mounting bracket 206 is secured to the structure with the fasteners 238 and the feed bucket 202 is secured to the mounting bracket 206 with the mounting portion 214 thereof.

The animal feeding system 200 includes a receptacle portion 204 that is substantially the same as the receptable portion 104 of the first embodiment; however, in this embodiment the base 208 of the receptacle portion 204 is planar and does not include a raised protrusion.

The animal feeding system provides for a method of feeding animals. In various embodiments, the method may include providing the feeding bucket, securing the mounting bracket to a structure, coupling the feeding bucket to the mounting bracket by inserting the securing member of the mounting bracket through the slot and into the recess of the mounting portion of the receptacle portion to releasably secure the feeding bucket to the structure, and storing an animal feed in a space of the receptacle portion defined by, in combination, the base and the sidewalls thereof.

Alternative embodiments are contemplated in addition the embodiments(s) shown and/or described herein. For example, one or more of the elements of the embodiments described herein may be omitted to included in the other of the embodiments. In some embodiments, the receptacle portion may have other cross-sectional shapes and/or may have other opening shapes defined by the rim. In some embodiments, the mounting bracket may be secured to a structure or object in a manner other than those described herein.

The animal feeding system may include various materials including certain polymeric, ceramic, metallic, and/or composite materials.

In various embodiments, the receptacle portion of the feed bucket may have dimensions that promote ease of access and/or comfort to animals while feeding therefrom. In some embodiments, the compartment is at least 13 inches wide, such as between 13 and about 16 inches wide (i.e., 33 to about 41 cm), and at least 12 inches deep, such as between 12 and about 19 inches deep (i.e., 30 to about 49 cm).

Since many modifications, variations, and changes in detail can be made to the described preferred embodiments of the invention, it is intended that all matters in the foregoing description and shown in the accompanying drawings be interpreted as illustrative and not in a limiting sense. Furthermore, it is understood that any of the features presented in the embodiments may be integrated into any of the other embodiments unless explicitly stated otherwise. The scope of the invention should be determined by the appended claims and their legal equivalents.

What is claimed is:

1. An animal feeding system comprising:
   a feed bucket comprising:
   a receptacle portion having a base at a lower end thereof, sidewalls coupled to the base, and a rim of the sidewalls defining an opening at an upper end thereof opposite the base, wherein the base and the sidewalls in combination define a space configured to receive and store feed;
   a mounting portion having an upper wall fixed to and extending from the sidewalls of the receptacle portion and an outer wall extending from the upper wall along and spaced apart from the sidewalls of the receptacle portion to define a recess between the upper wall and the outer wall of the mounting portion and the sidewalls of the receptacle portion, the mounting portion having a slot adjacent a lower end of the receptacle portion that provides access to the recess; and
   a mounting bracket configured to be secured to a structure, the mounting bracket having a securing member configured to be received through the slot and into the recess of the mounting portion to releasably secure the feed bucket to the structure and, wherein
   the sidewalls of the receptacle portion have contoured cross-sectional shapes that extend from the base of the receptacle portion, protrude inward, and then flare outward at the rim and wherein
   the mounting bracket is a channel plate bracket that includes a first plate configured to be secured to the wall of the structure, oppositely disposed end walls extending from the first plate, and a pair of oppositely disposed flanges connected to and extending from the end walls, wherein the flanges extend toward each other and wherein
   the mounting bracket extends to a position substantially below a bottom of the receptacle portion, and wherein
   the outer wall of the mounting portion extends to a distance substantially along the bottom of the receptacle portion.

2. The animal feeding system of claim 1, wherein the base of the receptacle portion may include a centrally located raised portion protruding inward that defines a ring-shaped recess between sides of the raised portion and the sidewalls of the receptacle portion adjacent the base.

3. The animal feeding system of claim 1, wherein the mounting bracket includes a recess configured to receive and releasably retain the outer wall of the mounting portion therein.

4. The animal feeding system of claim 1, wherein the receptacle portion includes a handle having ends thereof pivotally coupled to oppositely disposed sides of the rim of the receptacle portion.

5. The animal feeding system of claim 4, wherein the ends of the handle are configured to pivot relative to the rim such that the handle is capable of contacting and resting against a portion of the rim, wherein the portion of the rim includes a recess configured to promote gripping of the handle when resting on the rim.

6. The animal feeding system of claim 1, wherein the mounting portion includes sidewalls extending from the sidewalls of the receptacle portion which are connected to the outer wall of the mounting portion such that the slot is the sole access to the recess.

7. The animal feeding system of claim 1, wherein the mounting bracket is configured to be secured to the structure with fasteners.

8. A method comprising:
providing a feed bucket that includes a receptacle portion having a base at a lower end thereof, sidewalls coupled to the base, and a rim of the sidewalls defining an opening at an upper end thereof opposite the base, and a mounting portion having an upper wall fixed to and extending from the sidewalls of the receptacle portion and an outer wall extending from the upper wall along and spaced apart from the sidewalls of the receptacle portion to define a recess between the upper wall and the outer wall of the mounting portion and the sidewalls of the receptacle portion, the mounting portion having a slot adjacent a lower end of the receptacle portion that provides access to the recess and, wherein
the sidewalls of the receptacle portion have contoured cross-sectional shapes that extend from the base of the receptacle portion, protrude inward, and then flare outward at the rim, and wherein
the outer wall of the mounting portion extends to a distance substantially along the bottom of the receptacle portion;
securing a mounting bracket to a structure wherein
the mounting bracket is a channel plate bracket that includes a first plate configured to be secured to the structure, oppositely disposed end walls extending from the first plate, and a pair of oppositely disposed flanges connected to and extending from the end walls, wherein the flanges extend toward each other and wherein
the mounting bracket extends to a position substantially below a bottom of the receptacle portion,
coupling the feed bucket to the mounting bracket by inserting a securing member of the mounting bracket through the slot and into the recess of the mounting portion of the receptacle portion to releasably secure the feed bucket to the structure; and,
storing an animal feed in a space of the receptacle portion defined by, in combination, the base and the sidewalls thereof.

9. The method of claim 8, wherein the base of the receptacle portion includes a centrally located raised portion protruding inward that defines a ring-shaped recess between sides of the raised portion and the sidewalls of the receptacle portion adjacent the base.

10. The method of claim 8, wherein the step of coupling the feed bucket to the mounting bracket includes receiving and releasably retaining the outer wall of the mounting portion of the receptacle portion in a recess of the mounting bracket.

11. The method of claim 8, wherein the receptacle portion includes a handle having ends thereof pivotally coupled to oppositely disposed sides of the rim of the receptacle portion.

12. The method of claim 11, wherein the method further includes the step of pivoting the ends of the handle relative to the rim such that the handle contacts and rests against a portion of the rim, and then gripping the handle adjacent a recess in the portion of the rim while the handle is resting on the rim.

13. The method of claim 8, the mounting portion includes sidewalls extending from the sidewalls of the receptacle portion which are connected to the outer wall of the mounting portion such that the slot is the sole access to the recess.

14. The method of claim 8, wherein the method step of securing the mounting bracket to the wall of the structure is done with fasteners.

* * * * *